United States Patent [19]

Kreitzer et al.

[11] Patent Number: 4,655,562
[45] Date of Patent: Apr. 7, 1987

[54] OBJECTIVE LENS SYSTEM, RELAY LENS SYSTEM, AND EYEPIECE LENS SYSTEM FOR NIGHT-VISION GOGGLES

[75] Inventors: Melvyn H. Kreitzer, Cincinnati, Ohio; Ellis I. Betensky, Redding, Conn.

[73] Assignee: FJW Industries, Inc., Chicago, Ill.

[21] Appl. No.: 723,117

[22] Filed: Apr. 15, 1985

[51] Int. Cl.$^4$ ............... G02B 23/12; G02B 23/02; G02B 9/12

[52] U.S. Cl. ................................. 350/538; 350/1.4; 350/569; 350/474

[58] Field of Search ............... 350/538, 569, 561, 412, 350/438, 1.1, 1.2, 1.3, 1.4, 474

[56] References Cited

U.S. PATENT DOCUMENTS

| | | | |
|---|---|---|---|
| 3,394,975 | 7/1968 | Coniglio | 350/1.2 |
| 3,529,882 | 9/1970 | Schmidt | 350/538 |
| 3,907,401 | 9/1975 | Liu | 350/1.3 |
| 3,915,547 | 10/1975 | Scidmore et al. | 350/1.3 |
| 4,178,075 | 11/1979 | Rogers | 350/412 |
| 4,205,894 | 6/1980 | Filipovich et al. | 350/538 |
| 4,266,848 | 5/1981 | Schlegel | 350/538 |
| 4,467,190 | 8/1984 | Hadani | 350/538 |

FOREIGN PATENT DOCUMENTS

| | | | |
|---|---|---|---|
| 29005 | 5/1981 | European Pat. Off. | 350/538 |
| 1128678 | 4/1962 | Fed. Rep. of Germany | 350/1.2 |
| 1294059 | 4/1969 | Fed. Rep. of Germany | 350/1.2 |
| 1480611 | 4/1967 | France | 350/1.2 |
| 913894 | 12/1962 | United Kingdom | 350/538 |
| 1010126 | 11/1965 | United Kingdom | 350/538 |

Primary Examiner—Jon W. Henry
Attorney, Agent, or Firm—Milton S. Gerstein; Marvin N. Benn

[57] ABSTRACT

The goggles include a pair of optical assemblies, each having two intersecting optical paths, including a see-through path with a large field of view on a straight line of sight to the viewed object, and a folded path which includes an objective lens set, an intensifier which converts visible and infrared light to a visible intensified light, and an eyepiece lens set, arranged in a loop in a plane perpendicular to the see-through path. Infrared and visible light from the viewed object enters both paths. A dichroic prism combiner at the intersection of the paths reflects intensified light from the folded path into the see-through path and transmits all other light. In one embodiment a dichroic prism separator is disposed at the intersection of the paths forward of the combiner for transmitting a portion of the incoming visible light along the see-through path and reflecting the remainder of the incoming light to the folded path. In another embodiment, the entrance to the folded path is spaced from the see-through path.

18 Claims, 13 Drawing Figures

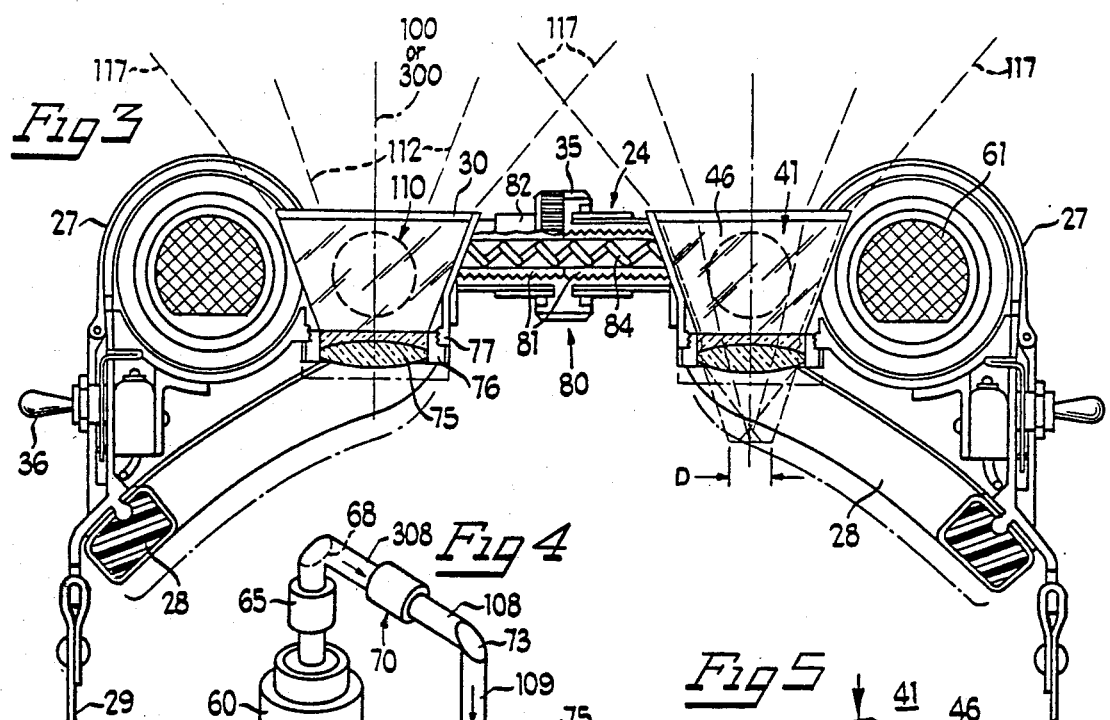

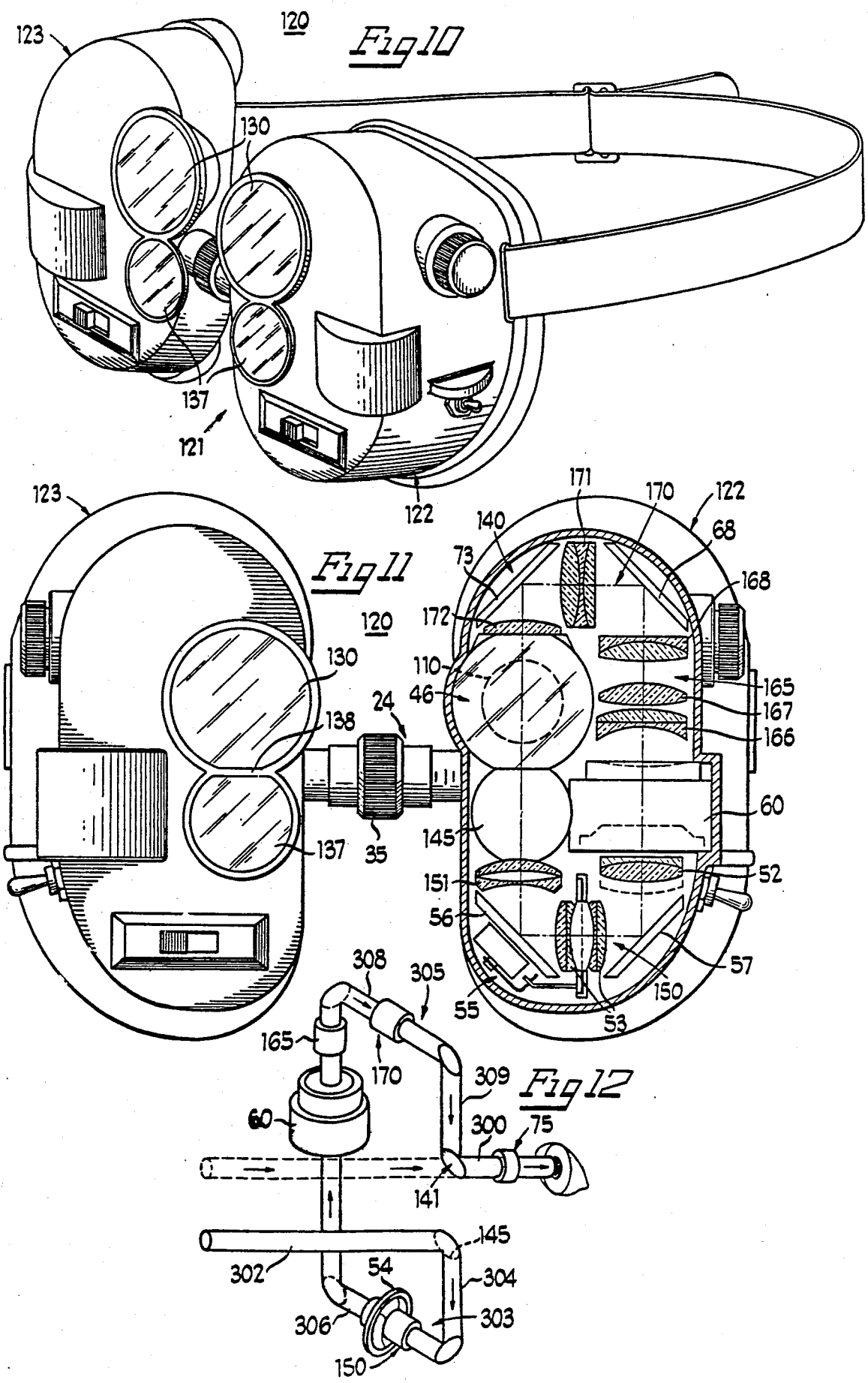

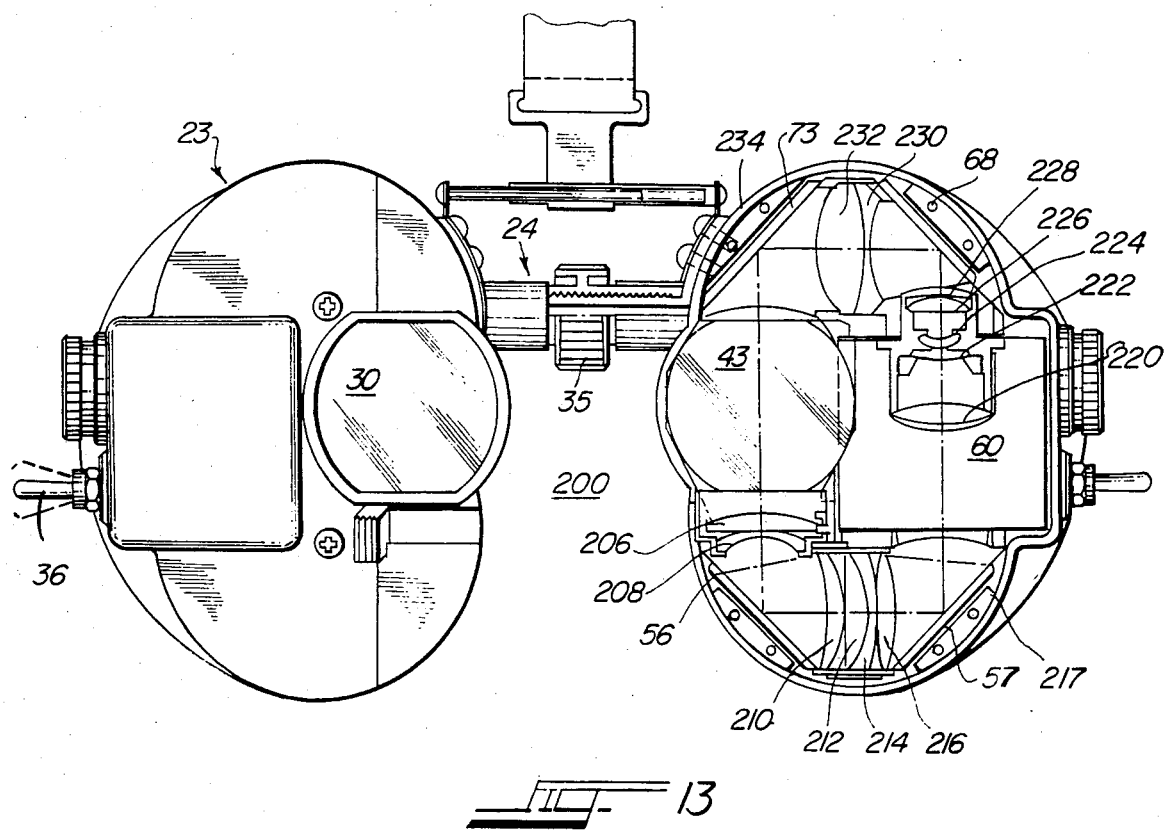

OBJECTIVE LENS SYSTEM, RELAY LENS SYSTEM, AND EYEPIECE LENS SYSTEM FOR NIGHT-VISION GOGGLES

BACKGROUND OF THE INVENTION

The present invention relates to night vision systems of the type disclosed in commonly-owned U.S. application Ser. No. 707,224, filed on Mar. 1, 1985, which permit vision under low light conditions by intensifying incoming infrared and/or visible light from an object and converting it to an intensified visible light. The invention has particular application to night vision systems of the binocular goggles type, which can be mounted on a viewer's head covering his eyes. One of the main applications of night vision systems are military in nature, and the goggles of the present invention is intended, as one of its main uses and applications, for aircraft pilots, though myriad other uses are possible and practicable, such as police, fire, commercial aviation applications, military aircraft, and night-blind people.

Existing night vision goggles are heavy, cumbersome and unstable. They do not even resemble common goggles, but rather resemble television cameras mounted on the viewer's head, protruding more than 175 mm from the viewer's eye, and weighing as much as 850 grams. The weight and front-to-back length of such systems exert large moments on the viewer's head, causing serious instability problems and preventing effective use of the systems in applications where the head is subjected to gravitational or centrifugal loads.

Night vision systems typically include an objective lens set, an image intensifier and an eyepiece lens set, all arranged in a straight line. The lens design may be such as to result in an inverted image at the viewer's eye. Correction of this condition by the addition of a further inverting lens set would only add to the already excessive length of the system, aggravating the instability problem. Accordingly, the condition is corrected by the use of twisted fiber optics in the intensifier. But such twisted fiber optics have a greater overall optical length, result in a more costly image intensifier and impair the registration or alignment of the two binocular channels.

Additionally, existing night vision goggles cannot handle sudden excessive lighting conditions, such as flares or other bright lights. In such conditions, the goggles become inoperative and must be turned off. When the intensifier is turned off, most prior systems become opaque, rendering the viewer essentially blind. It is known to provide night vision goggles wherein the main optical assembly is coupled to the user's eye through a periscope-type arrangement, the reflection to the viewer's eye being provided by a beam splitting prism which is transparent when the system is turned off, permitting the viewer to look past the main optical assembly. But such arrangements still suffer from all of the other disadvantages discussed herein.

Furthermore, prior systems have an extremely limited field of view with little or no peripheral vision. This renders such systems essentially useless for applications requiring peripheral vision, such as in police work where the viewer is driving an automobile or other vehicle, and must be able to view the instrument panel without significant head movement.

SUMMARY OF THE INVENTION

It is a general object of the present invention to provide an improved night vision apparatus which avoids the disadvantages of prior devices while affording additional structural and operating advantages.

An important object of the present invention is to provide an image intensifying night vision apparatus which has relatively low mass and short front-to-back dimensions, resulting in improved stability.

Another object of the invention is the provision of a night vision system of the type set forth which also has a see-through capability which renders the system substantially transparent when the intensifier is turned off.

In connection with the foregoing objects, it is another object of the invention to provide a night vision system of the type set forth, which provides a peripheral transparent or see-through field of view when the intensifier is turned on.

Yet another object of the invention is the provision of night vision system which remains operative in sudden high light conditions.

In connection with the foregoing objects, it is still another object of the invention to provide a night vision apparatus of the type set forth, which affords these advantages while permitting use of straight fiber optics in the intensifier.

These and other objects of the invention are attained by providing in night vision apparatus for receiving at an entrance plane visible and infrared light from a viewed object and forming an intensified image of the object along a viewing axis of a viewer's eye, the improvement comprising: means defining an optical path from the entrance plane to the viewer's eye, the optical path having a first portion which lies along the viewing axis and a second portion which is entirely non-parallel to said first portion and image intensifying means disposed in the second portion of the optical path.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings a preferred embodiments thereof, from an inspection of which, when considered in connection with the following description, the invention, its construction and operation, and many of its advantages should be readily understood and appreciated.

FIG. 3 is a view in horizontal section taken along the line 3—3 in FIG. 2;

FIG. 4 is a diagrammatic view of the optical assembly and paths therethrough in the right-hand portion of the goggles of FIG. 1;

FIG. 5 is a perspective view of the dichroic prism set of the goggles of FIG. 1;

FIG. 5 is a graph of the reflectance characteristic of one of the dichroic surfaces of the prism set of FIG. 5;

FIG. 7 is a graph of the reflectance characteristic of the other dichroic surface of the prism set of FIG. 5;

FIG. 8 is a side elevational view of the goggles of FIG. 1 mounted on the head of the user, illustrating the intensified and transparent fields of view;

FIG. 9 is a front view of the fields of view illustrated in FIG. 8;

FIG. 10 is a view similar to FIG. 1, illustrating goggles in accordance with a second embodiment of the present invention;

FIG. 11 is a view similar to FIG. 2, illustrating the goggles of FIG. 10; and

FIG. 12 is a diagrammatic view, similar to FIG. 4, illustrating the optical assembly and paths therethrough of the right-hand portion of the goggles of FIG. 10.

FIG. 13 is a front elevational view in partial vertical section of the goggles of the present invention showing in detail the individual lens components and their spacing for each of the objective lens system, the eyepiece lens system, and the relay lens system.

DESCRIPTION OF THE PREFERRED EMBODIMENTS

Figure 1:
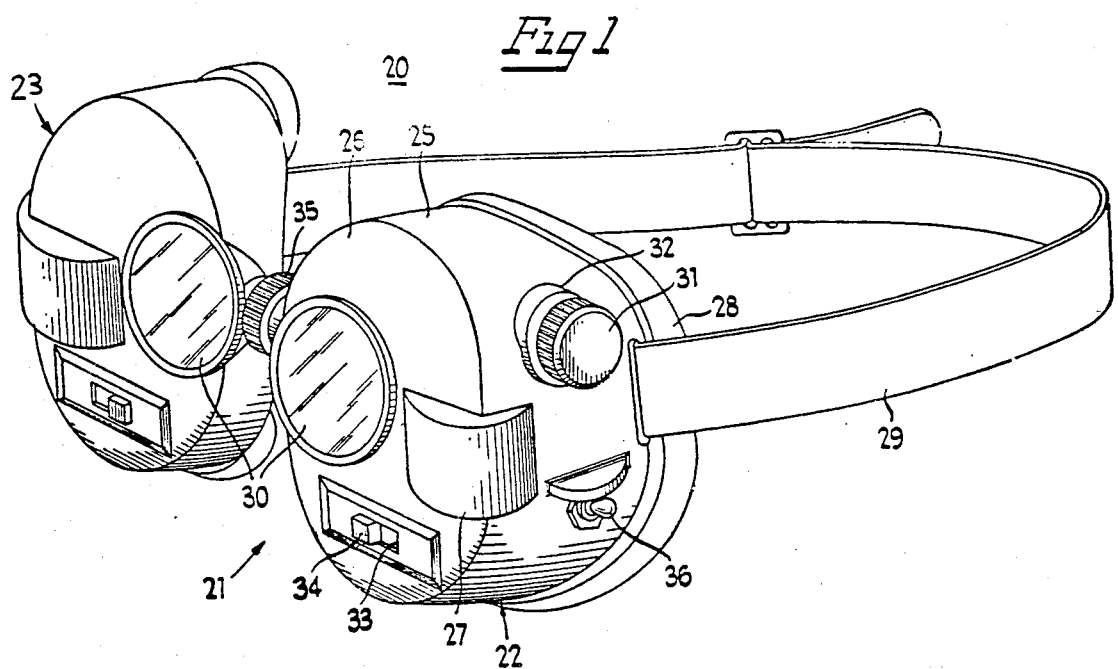
FIG. 1 is a perspective view of night vision goggles constructed in accordance with and embodying the features of a first embodiment of the present invention.
Figure 2:
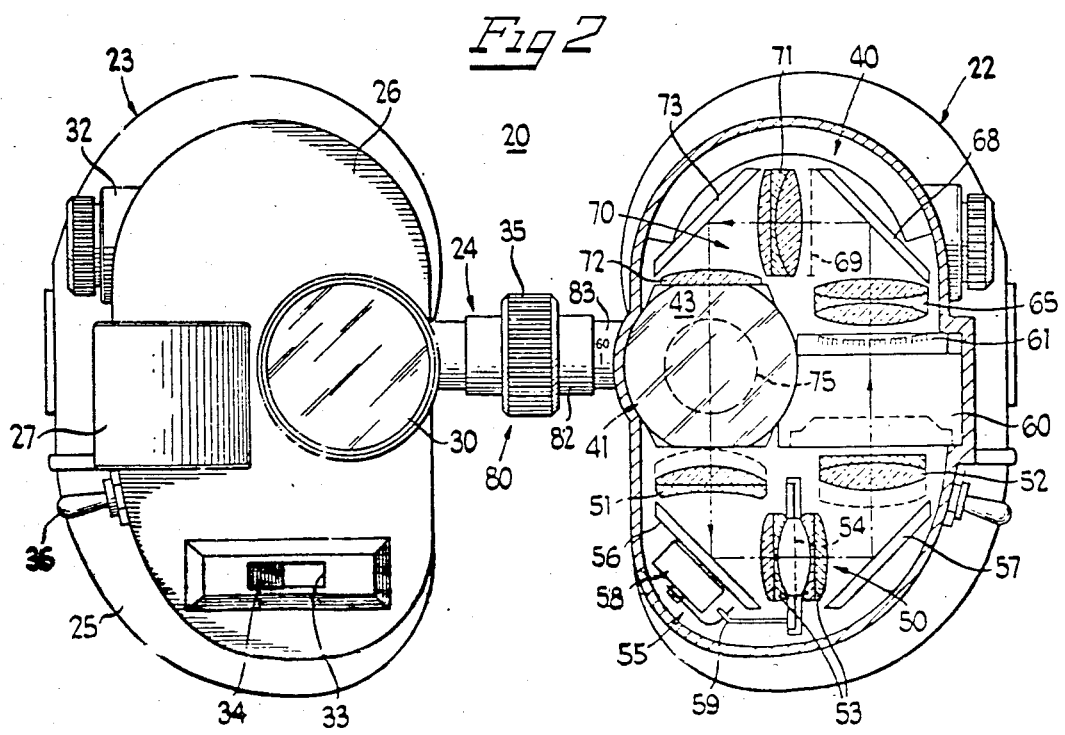
FIG. 2 is a front elevational view in partial vertical section of the goggles of FIG. 1.

Referring to FIGS. 1-3, there is illustrated a pair of night vision goggles, generally designated by the numeral 20, constructed in accordance with and embodying the features of a first embodiment of the present invention. The goggles 20 include a housing assembly 21 which comprises a pair of housings 22 and 23 arranged for respectively covering the left and right eyes of a viewer and interconnected by a bridge 24. The housing 22 and 23 are constructed as mirror images of each other, and each includes an encompassing peripheral side wall 25 closed at the front end thereof by a flat planar front wall 26. A part-cylindrical portion 27 projects forwardly and laterally outwardly from the housing generally centrally of the junction between the outer side edge of the front wall 26 and the peripheral side wall 25. The rear edge of the peripheral side wall 25 is provided with a face cushion 28 of suitable resilient material, such as foam rubber or the like. The face cushion 28 extends around substantially the entire perimeter of the side wall 25 except for the inner side edge thereof adjacent to the wearer's nose. The rear ends of the housing 22 and 23 are interconnected by a head strap 29 for mounting the goggles 20 on the viewer's head in standard fashion, with the housings 22 and 23 respectively covering the viewer's eyes, as indicated in FIG. 8.

Each of the housings 22 and 23 also has a circular input window 30 in the front wall 26 thereof adjacent to the inner side edge thereof, the window 30 being formed of a suitable transparent material such as glass or plastic. A battery cartridge 31 is mounted in a battery receptacle boss 32 on the outer side of the peripheral side wall 25. A rectangular slot 33 is formed in the front wall 26 adjacent to the lower end thereof and slidably receives a focusing knob 34 for providing continuous focusing of certain optical components of the goggle 20, as will be explained more fully below. The bridge 24 carries a knurled control wheel 35, the function of which will be explained below, and a power switch 36 is mounted on the peripheral side wall 25 for selectively connecting and disconnecting the battery cartridge 31 from an optical assembly 40 mounted within the housing 22 or 23.

Referring now more particularly to FIGS. 2, 3 and 5, each of the housings 22 and 23 contains an optical assembly 40. The two assemblies 40 are arranged as mirror images of each other, the optical assembly 40 for the left eye housing 22 being illustrated in FIG. 2. The optical assembly 40 includes a separating/combining prism set 41, which is diagrammatically illustrated in FIG. 5. The prism set 41 includes a separating prism 42 and a combining prism 46, each being of the dichroic beam splitting type. More specifically, the separating prism 42 includes an input surface 43, a separating surface 44 and an output surface 45, whereas the combining prism 46 includes an input surface 47, a combining surface 48 and an output surface 49.

The prisms 42 and 46 are arranged so that the separating and combining surfaces 44 and 48 are disposed in facing parallel relationship with a predetermined small gap therebetween to avoid interference with visible light transmission. In this configuration, the input surface 43 is arranged parallel to the output surface 49, while the input surface 47 is arranged parallel to the output surface 45. While, for clarity of illustration, the prisms 42 and 46 have been diagrammatically illustrated with rectangular surfaces in FIG. 3, it will be appreciated that, in practice, the prism set 41 has a somewhat conical configuration, with the input surface 43 and the output surface 49 being substantially circular in shape, and the input surface 47 being generally trapezoidal in shape, as indicated in FIGS. 2 and 3, with the input surface 43 disposed immediately behind the window 30.

In practice, incoming visible and infrared light from a viewed object enters the prism set 40 through the input surface 43. At the separating surface 44, a portion of the light is transmitted to the combining prism 46 and out through the output surface 49, while the remainder of the light is reflected out through the output surface 45. In like manner, when light enters the input surface 47, upon striking the combining surface 48, a portion is transmitted to the prism 42 and out through the output surface 45, while another portion is reflected out through the output surface 49.

The optical assembly 40 also includes an objective lens set 50 of separated groups, including lens groups 51 and 52 and a pair of lens groups 53 separated by an iris 54 of an automatic light control assembly 55. A mirror 56 is disposed between the lens group 51 and one of the lens groups 53, while another mirror 57 is disposed between the other lens group 53 and the lens group 52, so that the optical path is in the direction indicated by the arrows in FIG. 2. The automatic light control assembly 55 includes a motor 58 electrically connected to the battery cartridge 31 and mechanically connected by a linkage 59 to the iris 54. The motor 58 is also electrically connected to an image intensifier 60 which is mounted adjacent to the lens group 52. The image intensifier 60 is of standard construction, and includes circuitry for sensing the intensity of the light passing therethrough and providing to the motor 58 a feedback signal proportional to such intensity. For intensities above a predetermined level, the motor 58 will be actuated to close the iris 54 a sufficient amount to reduce the light passing therethrough to an acceptable level.

The image intensifier 60 is preferably an 18 mm microchannel wafer-type image intensifier, with a straight fiber optics output window 61. In operation, the image intensifier 60 receives incoming visible and infrared light from the objective lens set 50 and intensifies it, converting it to a visible output light in a predetermined narrow band of wave lengths. In a preferred embodiment, the output light from the image intensifier 60 is emitted by a green phosphor, producing a visible band of light which is known as "P-20" light, although it will be appreciated that image intensifiers 60 producing other output wave lengths could also be used.

The output from the image intensifier 60 is applied to a relay lens group 65, producing a secondary image which is reflected from a mirror 68 to an image plane 69. This image than passes through an eyepiece lens set 70, which includes a lens group 71 and a plano convex lens 72, a mirror 73 being interposed therebetween. The output of the eyepiece lens set 70 then passes into the combining prism 45 through the input surface 47 thereof.

The optical assembly 40 also includes a diopter adjusting lens 75 (FIG. 3) which is preferably a lens group and is carried in a circular holder 76, which is threadedly engaged in the rear end of a generlly conical housing receptacle 77 in the housing 22 (or 23). The diopter adjusting lens 75 is, therefore, disposed immediately adjacent to the output surface 49 of the combining prism 46, and may readily be replaced with other adjusting lenses, depending upon the diopter requirement of the particular viewer's eye.

The bridge 24 carries an interpupillary adjustment assembly 80 which includes a pair of coaxial, externally threaded inner tubes 81, respectively connected to the housings 22 and 23, and an internally threaded outer tube 82 which is threadedly engaged with each of the inner tubes 81 and is encircled by and fixedly secured to the knurled control wheel 35. Preferably, a micrometer scale 83 is imprinted on the outer surface of one or both of the inner tubes 81 to indicate the interpupillary distance between the optical assemblies 40. Disposed within the inner tubes 81 is a helical wound electrical wire 84 which powers both housings 22 and 23 from one electrical switch 36. By rotation of the outer tube 82 by use of the knurled wheel 35, the inner tubes 81 are moved axially toward and away from each other to vary the interpupillary distance to match that of the particular viewer who will be wearing the goggles 20.

The reflectance characteristic of the coating on the separating surface 44 of the prism 42 is illustrated in FIG. 5, which is a plot of percent reflectance against wave length in nanometers. The reflectance characteristic is indicated by the curve 90, which lies in a range between upper and lower limits designated, respectively, by the broken lines 91 and 91a, depending upon the quality of the dichroic coating on the separating surface 44. It can be seen that the separating surface 44 reflects approximately 50% of the wave lengths in the visible spectrum, between about 400 and 700 nm, as indicated by the generally horizontal portion 92 of the curve 90, the remainder of the incident visible light being transmitted through the separating surface 44. The curve 90 has a substantially vertical portion 93 at about 700 nm, all higher wave lengths being substantiall completely reflected, as indicated by the upper portion 94 of the curve 90. These wave lengths above 700 nm represent the infrared portion of the spectrum and, in practice, between 90% and 100% of the incident infrared light is reflected by the separating surface 44, depending upon the quality of the dichroic coating thereon. Any unreflected infrared light is, of course, transmitted through the separating surface 44. Preferably, the dichroic coating is selected so that at least 50% of the visible light is transmitted.

The reflectance characteristic of the coating on the combining surface 48 is illustrated in FIG. 7 by the curve 95, which lies in a range between upper and lower limits respectively designated by the broken lines 96 and 96a. The combining surface 48 selectively reflects a narrow band of wave lengths less than 100 nm in width, between the steep sides 97 of the curve 95, the band being centered at 550 nm at the peak 98, which is the wave length of the P-20 light emitted from the image intensifier 60. It can be seen that between 75% and 100% of this P-20 light at the peak 98 will be reflected, depending upon the quality of the dichroic coating on the combining surface 48. Wave lengths below 500 nm and above 600 nm are substantially completely transmitted through the combining surface 48, as indicated by the feet 99 of the curve 95. However, since only P-20 light is emitted from the image intensifier 60, therefore only P-20 light enters the input surface 47 of the prism 46, substantially all of this light being reflected out through the output surface 49. In order to prevent the small portion of P-20 light that is transmitted through the combining surface 48 from entering the objective lens set 50, a pair of polarizing filters (not shown) could be applied respectively on the input surface 47 and the output surface 45.

The approximately 50% of the visible light transmitted through the separating surface 44 will suffer some additional loss in passing through the combining surface 48. However, this loss can be minimized by the use of a holographically formed coating on the combining surface 48 by techniques known to those skilled in the art.

Referring now in particular to FIGS. 2, 3 and 4, the operation of the optical assembly 40 will be explained in detail. FIG. 4 shows a diagrammatic representation of the optical assembly 40 and the light paths therethrough for the right eye housing 23, but it will be appreciated that the corresponding diagram for the optical assembly 40 in the left eye housing 22 would simply be a mirror image. The entire spectrum of light from the viewed object, including visible and infrared light, enters the optical assembly 40 at an entrance plane defined by the window 30. This light enters along a see-through path 100 having a front portion 101 forward of the prism set 41 and a rear portion 102 rearward of the prism set 41. It can be seen that the see-through path 100 is a straight-line path along the viewing axis of the viewer's eye, which lies along the line of sight from the viewer's eye to the viewed object.

When this light strikes the separating surface 44 of the separating prism 42, approximately 50% of the visible light and virtually all of the infrared light is reflected downwardly along a vertical leg 104 of a folded intensified light path 105, which defines a loop lying in a plane substantially perpendicular to the see-through path 100. The reflected light in the folded path 105 is reflected from the mirror 56 along horizontal leg 106 and then from the mirror 57 into a vertical leg 107, in the direction indicated by the arrows in FIG. 4. The objective lens set 50 is, for convenience, diagrammatically illustrated in the leg 106 although, as can be seen from FIG. 2, the objective lens set 50 actually includes separated lens groups which are disposed on either side of the mirrors 56 and 57.

The light that is reflected into the leg 107 passes through the image intensifier 60, being converted to an intensified P-20 light, which then passes through the relay lens group 65. The output from the relay lens group 65 passes through the eyepiece lens set 70 to the input surface 47 of the combining prism 46, being reflected en route by the mirror 68 into a horizontal leg 108 and thence by the mirror 73 to a descending leg 109 of the path 105. While, for convenience, the eyepiece lens set 70 is diagrammatically illustrated in the leg 108, it will be understood that it comprises separated elements which are disposed on either side of the mirror 73.

When the P-20 light arrives at the combining surface 48 of the prism 46, it is substantially all reflected into the rear portion 102 of the see-through path 100 through the output surface 49, joining the approximately 50% of the visible light which was transmitted through the separating prism 42. This combined light is then passed through the diopter adjustment lens 75 to the viewer's eye.

The purpose of the relay lens group 65 is to invert the image from the image intensifier 60 to complement an inversion effected by the objective lens set 50, thereby insuring that an erect image will be presented to the viewer's eye. Alternatively, it will be appreciated that twisted fiber optics could be used in the image intensifier 60 to effect the necessary image inversion, although this has attendant disadvantages, as explained above.

It is a fundamental aspect of the present invention that the unique arrangement of the optical assemblies 40 results in goggles 20 with significantly reduced front-to-back dimensions. More particularly, most of each optical assembly 40 is arranged in the folded path 105 which lies in a plane disposed perpendicular to the viewing axis. The only optical components disposed along the viewing axis are the separating/combining prism set 41 and the diopter adjusting lens 75. This results in a goggles housing assembly 21 which has a total front-to-back depth of only about 70 mm as opposed to prior art devices with depths in excess of 175 mm. Additionally, the total weight of the goggles 20 is only about 350 grams, as opposed to weights between 650 and 850 grams for prior night vision goggles. The significantly reduced mass and depth of the goggles 20 results in a vastly reduced moment relative to the viewer's eye of about 730 g/cm, as compared with moments of about 6000 g/cm for prior goggles. Thus, the present invention provides greatly enhanced stability in use.

Another significant feature of the invention is that it offers the aforementioned stability, while at the same time providing a see-through capability. Thus, the use of beam splitting prisms 42 and 46 in the see-through path 100 along the viewing axis which are at least 50% transparent to visible light, permits a viewer to see through the goggles 20 even when the image intensifiers 60 are turned off. Accordingly, the viewer can turn on the image intensifiers 60 only when they are needed, thereby significantly reducing power consumption and battery drain.

Furthermore, another significant aspect of the invention is that the optical assemblies 40 are designed so that the transparent or see-through field of view is significantly greater than the intensified field of view, thereby affording the viewer significant unintensified peripheral vision, when the image intensifiers 60 are turned on. Referring in particular to FIGS. 3, 8 and 9, the size of the output area of the image intensifier 60 (about 18 mm) and the focal length of the eyepiece lens set 70 are such that there is formed on the input surface 47 of the combining prism 46 an intensified image area 110 (FIG. 3). This affords a circularly conical intensified image field of view 111 of substantially 45 degrees. More specifically, the intensified image field of view 111 has a substantially conical boundary 112 which is substantially coaxial with the viewing axis along the see-through path 100. This is about the same angle intensified field of view as is afforded by prior night vision goggles.

However, the prism set 41 is designed with external dimensions such as to provide a transparent image field of view 115 which is substantially greater than the intensified image field of view 111. More particularly, the transparent image field of view 115 is coaxial with the intensified image field of view 111 and has a circularly conical outer boundary 117 with a conical angle of at least 80 degrees, and preferably 90 degrees. Thus, the conical angle of the transparent image field of view 115 is approximately twice that of the intensified image field of view 111, affording transparent or see-through vision extending 45 degrees above and below the viewing axis.

It will be appreciated that the area between the outer boundary 112 of the intensified image field of view 111 and the outer boundary 117 of the transparent image field of view 115 affords an annular peripheral vision field of view. This peripheral vision field of view is adequate, for example, to permit the viewer to see an instrument panel 118 of an aircraft, or the like, by a simple movement of the eyes. In this regard, the fiber-optic output window 61 of the image intensifier 60 may be truncated, as indicated in FIG. 3, to produce a cutoff lower edge 119 of the intensified image field of view 111 (FIGS. 8 and 9) to prevent the intensified image field of view from overlapping objects, such as the instrument panel 118, in the peripheral vision field of view. In the preferred embodiment, the cutoff lower edge 119 is positioned so that the intensified image field of view 111 extends approximately 17 degrees below the viewing axis. It will be understood that, when the image intensifier is turned off, the entire transparent image field of view 115 is transparent to approximately 50% of the incoming visible light from the viewing object.

Another aspect of the invention is that the automatic light control assembly 55 insures that the goggles 20 will be operative in sudden excessive lighting conditions, such as in the presence of flares or the like. Thus, as soon as the excessive lighting condition is sensed by the image intensifier 60, it sends a feedback signal to the motor 58 for closing the iris 54 the necessary amount. In the preferred embodiment the automatic light control assembly 55, which is of known construction and may be of the type used in SLR and movie cameras, has a minimum aperture ratio of 1,000:1. In addition, the optical assembly 40 could be designed to provide anti-laser protection. Thus, one or more of the optical elements in the folded path 105 may be made of Schott KG-3 glass, which is capable of absorbing up to 99.9% of 1064 nm laser energy.

In the preferred embodiment of the invention, the optical assembly 40 is designed to have a magnification of 1.00 and a resolution of 0.61 lines per milliradian, and the focus range of the objective lens set 50 is from 25 cm to infinity. The objective lens set 50 forms a lens with an aperture of f/1.2 and t/1.65 with an effective focal length of 21.7 mm. The eyepiece lens set 70 has an effective focal length of 22.8 mm and an exit pupil diameter D (FIG. 3) of 7.5 mm.

The diopter adjustment is preferably between +2 and −6 diopter. The interpupillary distance is adjustable between 51 and 72 mm and the eye relief, i.e., the axial distance between the viewer's eye and the diopter adjusting lens 75, is 13 mm when the goggles 20 are properly seated over the viewer's eyes. The overall dimensions of the goggles 20 are 95 mm height×160 mm width×70 mm depth, and they protrude only 40 mm from the viewer's eye.

Referring now to FIGS. 10–12, there is illustrated another embodiment of the goggles of the present invention, generally designated by the numeral 120. The goggles 120 are similar to the goggles 20 and common parts bear the same reference numerals. The goggles 120 include a housing assembly 121 having left and right eye housings 122 and 123 which are fundamentally the same as the housings 22 and 23 described above, except that they have a slightly greater height, preferably about 110 mm. Each of the housings 122 and 123 has a large input window 130 which is substantially the same as the input windows 30 described above, and immediately therebelow a small input window 137. The windows 130 and 137 preferably overlap slightly along a truncation line 138.

Each of the housings 122 and 123 has an optical assembly 140, which differs in only a few respects from the optical assemblies 40 described above. More particularly, the optical assembly 140 includes a mirror 145 immediately behind the input window 147 for reflecting all of the incoming light downwardly to an objective lens set 150, which is substantially the same as the objective lens set 50 described above, except that its first element is a lens group 151. The optical path then proceeds through the image intensifier 60 to a relay lens set 165 comprising a plurality of separated elements 166, 167 and 168. The relay lens set 165 serves the same function as the relay lens group 65, above, i.e., to invert the image from the image intensifier 60. The optical path then extends through an eyepiece lens set 170, which includes a lens group 171 between the mirrors 68 and 73, and a plano-convex lens element 172. Immediately beneath the lens element 172 and behind the input window 130 is a combining prism set 141 which is substantially identical to the prism set disclosed above with respect to FIGS. 1–4, except that it has no coating on the surface 44.

Referring to FIGS. 11 and 12, it can be seen that the optical paths formed by the optical assembly 140 are slightly different from those formed by the optical assembly 40. More particularly, there is a straight-line, see-through path 300 along the viewing axis which passes through the input window 130 and the prism set 141 and the diopter adjustment lens 75 to the viewer's eye. It will be appreciated that both visible and infrared light passes along this path 300, but the infrared light is not visible to the viewer.

The full spectrum of visible and infrared light from the viewed object also enters the input window 137 to a straight line portion 302 of an intensified light path 305, which is disposed substantially parallel to the see-through path 300, but is spaced therefrom a predetermined distance, preferably about 20 mm. All of this light is reflected by the mirror 145 into a folded portion 303 of the path 305, which includes legs 304, 306, 307, 308 and 309, all lying in a plane disposed substantially perpendicular to the see-through path 300. It will be noted that the objective lens set 150 and the eyepiece lens set 170 are, respectively, diagrammatically shown in the legs 306 and 308 of FIG. 12, although it will be appreciated that the actual positions of the lens elements are as illustrated in FIG. 11. In operation, the visible and infrared light in the intensified light path 305 is converted by the image intensifier 60 to P-20 light, which is reflected by the prism set 141 into the see-through path 300 and to the eye of the viewer.

Except as just indicated, the operation of the goggles 120 is exactly the same as was described above for the goggles 20. The housing assembly 121 is slightly larger than the housing assembly 21, but the optical assembly 140 is more efficient than the optical assembly 40, since the full spectrum of light from the viewed object passes through the image intensifier 60. The slight separation of the see-through path 300 from the straight-line portion 302 of the intensified light path 305 may cause some parallax at close-up vieweing, but the effect is very minimal.

The optical characteristics of the optical assembly 140 are substantially the same as those described above for the optical assembly 40, except that the aperture of the objective lens set 150 is t1.45. The slightly larger housing assembly 121 weights approximately 400 grams, resulting in a moment relative to the viewer's eye of 850 g/cm.

In FIG. 13 there is shown the details of the lens system components of the goggles of FIG. 1, where like parts are indicated by like reference numerals. The pair of goggles 200 of FIG. 13 differs from that of FIG. 1 in that the automatic light control assembly 50 is absent from the goggles 200. Otherwise, the same general features are same, with the pair of goggles 200 showing the actual system components of each of the objective lens system 50, the relay lens system 65, and the eyepiece lens system 70. The objective lens system 50 is made up of lens components 206, 208, 210, 212, 214, 216 and 218 in FIG. 13. The relay lens system 65 is made up of lens components 220, 222, 224 and 228. The eyepiece lens system 70 is made up of lens components 230, 232 and 234. With regard to the following details of the lens components, positive radii indicate positive power surfaces, while negative radii indicate negative power surfaces.

With attention now to the objective lens system components, the component 206 is a positive-power meniscus lens having an entrance radius of 34.170 mm., and an exit radius of −197.813 mm., with a thickness of 2.3 mm. The index of refraction with respect to the air of the glass of component 206 is 1.834, and has a dispersion value of 373. The clear aperture of the entrance radius is 20.69 mm., and the clear aperture of the exit radius is 20.08 mm. The distance from component 206 to 208 is 0.100 mm.

Component 208 is a negative-power meniscus lens having an entrance radius of 15.740 mm., and an exit radius of −9.3848 mm., with thickness of 1.200 mm. The index of refraction with respect to air of the glass of component 208 is 1.834, and has a dispersion value of 373. The clear aperture of the entrance radius is 14.57 mm., and the clear aperture of the exit radius is 12.60 mm. The first group made up of lenses 206 and 208 is, therefore, a negative power group.

Component 210 is also a positive meniscus lens having an entrance radius of −32.968 mm. and an exit radius of 15.740 mm., with thickness of 3.1 mm. The index of refraction of the glass of the component with respect to air is 1.713, and has a dispersion value of 538. The clear aperture of the entrance radius is 19.58 mm. and the clear aperture of the exit radius is 20.04 mm. The air space between component 210 and 208 is 24.000 mm. taken along the central axial light path as shown, along the direction from component 208 to mirror 56 to component 210.

Component 212 is a positive crown lens forming part of the doublet 212-214 for color correction, and has an entrance radius of 187.890 mm., and an exit radius of 15.473 mm., and a thickness of 3.1 mm. The index of refraction of the glass of the component with respect to the air is 1.487, and has a dispersion value of 704. The clear aperture of the entrance radius is 18.61 mm., while the clear aperture of the exit radius is 18.35. The central axial air space between component 212 and component 210 is 0.100 mm.

Component 214 is a negative meniscus flint lens of the doublet 212-214, and has an entrance radius of −15.473 mm. and an exit radius of 41.483 mm., with a thickness of 1.20 mm. The glass of component 214 has an index of refraction with respect to air of 1.847, with a dispersion value of 238. The clear aperture of the entrance radius is 18.35 mm., and the clear aperture of the exit radius is 18.57 mm. The components 212 and 214 touch one another, and have no central axial air space therebetween.

Component 216 is a bi-convex lens having an entrance radius of 41.923 mm. and an exit radius of 65.345 mm., with a thickness of 2.700 mm. The glass of the lens has an index of refraction with respect to air of 1.620, and has a dispersion value of 603. The clear aperture of the entrance radius is 18.49 mm. and the clear aperture of the exit radius is 18.52 mm. The central axial air space from component 214 to 216 is 0.100 mm. The second group made up of lenses 210, 212, 214 and 216 is, therefore, a positive power group.

Component 218 is a negative meniscus field flattener lens having an entrance radius of −19.600 mm. and an exit radius of 458.847 mm. The thickness is 1.200 mm., and the index of refraction with respect to air of the glass of the component is 1.806, with a dispersion value of 407. The clear aperture of the entrance radius is 15.65 mm. and the clear aperture of the exit radius is 16.49 mm. The central axial air space from component 216 to component 218 along the axial light path as shown in FIG. 13 is 22.000 mm. The air space from component 218 to the input of the intensifier 60 is 0.2827 mm.

Turning now to the relay system components 220-228, component 220 is a bi-convex lens having an entrance radius of 43.180 mm. and an exit radius of 31.011 mm., with a thickness of 3.000 mm. The glass of the component has an index of refraction with respect to air of 1.834, and a dispersion value of 373. The clear aperture of the entrance radius is 15.94 mm., while clear aperture of the exit radius is 15.67 mm. Component 220 is spaced from the output of the image intensifier by a central axial air space of 1.6244 mm.

Component 222 is a convex lens having an entrance radius of 12.133 mm. and an exit radius of −110.148, with a thickness of 2.000 mm. The glass of the component has an index of refraction with respect to air of 1.807, and a dispersion value of 316. The clear aperture of the entrance radius is 8.60 mm., while the clear aperture of the exit radius is 7.63. The air space distance from the component 220 to 222 is 7.501 mm.

Component 224 is a meniscus lens having an entrance radius of 4.855 mm., and an exit radius of −3.411 mm., with a thickness of 1.800 mm. The glass of the component has an index of refraction with respect to air of 1.805, with a dispersion value of 255. The clear aperture of the entrance radius is 5.92 mm., and the clear aperture of the exit radius is 3.75 mm. The air space distance between components 222 and 224 is 0.100 mm.

Component 226 is a convex lens having an entrance radius of −42.761 mm. and an exit radius of 7.750 mm., with a thickness of 2.400 mm. The glass of the component has an index of refraction with respect to air of 1.807, with a dispersion value of 316. The clear aperture of the entrance radius is 8.95 mm., while the clear aperture of the exit radius is 9.74 mm. The central axial air space distance between component 224 and 226 is 5.081 mm.

Component 228 is a meniscus lens having an entrance radius of −34.634 mm., and an exit radius of 18.980 mm., with a thickness of 1.400 mm. The glass of the component has an index of refraction with respect to air of 1.807, with a dispersion value of 316. The clear aperture of the entrance radius is 10.37 mm., while the clear aperture of the exit radius is 10.75 mm. The air space distance between components 226 and 228 is 0.100 mm.

Component 230 is a flint lens of the doublet 230-232, and has an entrance radius of −21.361 mm., and an exit radius of −36.000 mm., with a thickness of 1.200 mm. The glass of the lens has an index of refraction with respect to air of 1.805, and a dispersion value of 255. The clear aperture of the entrance radius is 17.93 mm., while the clear aperture of the exit radius is 21.94 mm. The air space distance between components 228 and 230 is 18.566 mm., as taken along the axial light path as shown in FIG. 13 as it travels from component 230 to the mirror 68 and thence to the component 230.

Component 232 is a crown lens of the doublet 230-232 used for color correction, and has an entrance radius of 36.000 mm. and an exit radius of 16.492 mm. The thickness of the component is 8.400 mm. The index of refraction of the glass of the component with respect to air is 1.804, with a dispersion value of 465. The clear aperture of the entrance radius is 21.94 mm., and the clear aperture of the exit radius is 23.15 mm. The air space distance from component 230 to 232 is zero.

Component 234 is a plano-convex lens having an entrance radius of 36.471 mm., and a thickness of 3.000 mm. The index of refraction of the glass of the component is 1.806, with a dispersion value of 407. The clear aperture of the entrance radius is 21.52 mm., while the clear aperture of the planar exit radius is 21.14 mm. The distance between components 232 and 234 along the central axial light path shown in FIG. 13 is 20.000 mm.

The exit output of the image intensifier 60 has a radius of 18.000 mm.

From the foregoing, it can be seen that there has been provided an improved night-vision goggles which has very low mass and front-to-back depth, resulting in increased stability, and which nevertheless afford see-through vision when the intensifier is off and substantial peripheral see-through vision when the intensifier is on, the goggles also remaining operable in sudden excessive light conditions.

What is claimed is:

1. An objective lens system for use in a night vision system, which night vision system includes a bent path through which the incoming light travels, comprising, in combination:

a first negative power group at the first end of the path of travel of the light;

a positive power group spaced from said first negative power group along the path of travel of the light;

a second negative power lens means spaced from said positive power group along the path of travel of the light; means for spacing said positive power group between said first negative power group and said second negative power lens means; and an entrance located adjacent said first negative power group for admitting the light therethrough to said first negative power group, so that the light travels from said first negative power group to said positive power group and then to said second negative power lens means;

said first negative power group comprising a positive lens and a negative meniscus lens; said positive power group comprising a positive meniscus lens, a doublet lens system, and a bi-convex lens; and said second negative power lens means comprising a negative field flattener lens; said second negative power lens means being mounted such that the axis of the lens thereof is at right angles to the axes of the lenses of said positive power group.

2. The objective lens system according to claim 1, wherein the central axis of said first negative power group is perpendicular to the central axis of said positive power group, and the central axis of said second negative power lens mean is perpendicular to the central axis of said positive power group.

3. In a night vision apparatus for receiving at an entrance plane visible and infrared light from a viewed object and forming an intensified image of the object along a viewing axis of a viewer's eye, which apparatus comprises an optical path having a first portion and a second portion, at least a portion of which is at an angle to said first portion, image intensifying means disposed in said second portion of the optical path, objective lens means in said optical path disposed forwardly of the image intensifying means, and eyepiece lens means disposed rearwardly of the image intensifying means, the improvement comprising:

said objective lens means having a first lens group of negative power, a second lens group spaced from said first lens group along the path of travel of the light, said second lens group being of positive power, and a third lens-means of negative power spaced from said second lens group along the path of travel of the light;

said first lens group comprising a first positive power lens, and a second negative-power meniscus lens, said first positive power lens being spaced closer to said entrance plane than said second negative-power meniscus lens; and said second positive lens group comprising a positive-power meniscus lens, a doublet lens, and a bi-convex lens; said positive-power meniscus lens of said second lens group being concave to the front.

4. The improvement according to claim 3, wherein said doublet lens of said second lens group comprises a first positive-power crown lens, and a second negative-power meniscus flint lens attached to said first positive-power crown lens; said negative-meniscus flint lens being concave to the front.

5. The improvement according to claim 3, wherein said first positive-power lens of said first lens group is convex to the front.

6. In a night vision apparatus for receiving at an entrance plane visible and infrared light from a viewed object and forming an intensified image of the object along a viewing axis of a viewer's eye, which apparatus comprises an optical path having a first portion and a second portion, at least a portion of which is at an angle to said first portion, image intensifying means disposed in said second portion of the optical path, objective lens means in said optical path disposed forwardly of the image intensifying means, and eyepiece lens means disposed rearwardly of the image intensifying means, the improvement comprising:

said objective lens means having a first lens group of negative power, a second lens group spaced from said first lens group along the path of travel of the light, said second lens group being of positive power, and a third lens-means of negative power spaced from said second lens group along the path of travel of the light;

said first lens group comprising a first positive power lens, and a second negative-power meniscus lens convex to the front, said first positive power lens being spaced closer to said entrance plane than said second negative-power meniscus lens.

7. The improvement according to claim 6, wherein said positive second lens group comprises a first positive-power meniscus lens concave to the front, a doublet lens spaced downstream from said first positive-power meniscus lens along the path of travel of the light, and a third bi-convex lens spaced downstream from said doublet lens along the path of travel of the light.

8. The improvement according to claim 7, wherein said third lens means comprises a negative-power field flattener lens.

9. In a night vision apparatus for receiving at an entrance plane visible and infrared light from a viewed object and forming an intensified image of the object along a viewing axis of the viewer's eye, which apparatus comprises an optical path having a first portion and a second portion, at least a portion of which is at an angle to said first portion, image intensifying means disposed in said second portion of the optical path, objective lens means in said optical path disposed forwardly of the image intensifying means, and eyepiece lens means disposed rearwardly of the image intensifying means, the improvement comprising:

said objective lens means comprising a first lens group of negative power, a second lens group spaced downstream from said first lens group of positive power along the path of travel of the light, and a third lens means spaced downstream from said second lens group along the path of travel of the light of negative power;

said second lens group comprising a first positive-power meniscus lens, a second doublet lens spaced downstream from said first positive-power meniscus lens along the path of travel of the light, and a third bi-convex lens spaced downstream along the path of travel of the light from said second doublet lens.

10. The improvement according to claim 9, wherein said first positive-power meniscus lens is concave to the front; said doublet lens comprising a positive crown lens, and a negative-power meniscus flint lens concave to the front.

11. The improvement according to claim 10, wherein said second lens group is made in accordance with the following chart of constructional data:

| LENS NO. | RADIUS (mm) | THICKNESS (mm) | AIR SPACE | n | CLEAR APERTURE ENTRANCE (mm) | CLEAR APERTURE EXIT (mm) |
|---|---|---|---|---|---|---|
| 210 | entrance = −32.968<br>exit = +15.740 | 3.100 | .100 | 1.713 | 19.58 | 20.04 |
| 212 | entrance = +187.890<br>exit = +15.473 | 4.200 | 0 | 1.487 | 18.61 | 18.35 |
| 214 | entrance = −15.473<br>exit = +41.483 | 1.200 | .100 | 1.847 | 18.35 | 18.57 |
| 216 | entrance = +41.923<br>exit = +65.345 | 2.700 | | 1.620 | 18.49 | 18.52 |

12. An objective lens system in combination with an eyepiece lens system for use in night vision goggles, comprising:
a first negative-power lens group;
a second positive-power lens group spaced downstream along the path of travel of the light from said first negative-power lens group and having a central axis thereof at an angle to the central axis of said first negative-power lens group;
a third negative-power lens means spaced downstream from said second positive-power lens group along the path of travel of the light, the central axis of said third negative-power lens means being at an angle to said central axis of said second positive-power lens group along the path of travel of the light;
an entrance plane located adjacent said first negative-power lens group for admitting light to said first negative-power lens group, so that light travels from said first negative-power lens group to said second positive-power lens group and then to said negative-power lens means; and
an eyepiece lens means spaced downstream from said third negative-power lens means along the path of travel of the light for imaging the rays from said objective lens group;
said first negative-power lens group comprising a first positive-power lens, and a second negative-power meniscus lens convex to said entrance plane.

13. The objective lens system according to claim 12, wherein said second negative-power meniscus lens of said first negative-power lens group has the following constructional data:

| RADIUS (mm) | THICKNESS (mm) | n | CLEAR APERTURE ENTRANCE (mm) | CLEAR APERTURE EXIT (mm) |
|---|---|---|---|---|
| entrance = +15.740<br>exit = −9.3848 | 1.200 | 1.834 | 14.570 | 12.600 |

14. The objective lens system according to claim 12, wherein said objective lens system comprises a first mirror mounted along the optical path between said first negative-power lens group and said second positive-power lens group for reflecting the divergent rays from said first negative-power lens group to said second positive-power lens group; and a second mirror mounted in the optical path between said second positive-power lens group and said third negative-power lens means for reflecting the convergent rays from said second positive-power lens group to said third negative-power lens means.

15. The objective lens system according to claim 12, further comprising an image intensifying means positioned along the optical path after said third negative-power lens means for intensifying infrared light impinging thereon, and thereafter directing said intensified light to said eyepiece lens means for viewing thereby.

16. An objective lens system in combination with an eyepiece lens system for use in night vision goggles, comprising:
a first negative-power lens group;
a second positive-power lens group spaced downstream along the path of travel of the light from said first negative-power lens group and having a central axis thereof at an angle to the central axis of said first negative-power lens group;
a third negative-power lens means spaced downstream from said second positive-power lens group along the path of travel of the light, the central axis of said third negative-power lens being at an angle to said central axis of said second positive-power lens group along the path of travel of the light;
an entrance plane located adjacent said first negative-power lens group for admitting light to said first negative-power lens group, so that light travels from said first negative-power lens group to said second positive-power lens group and then to said third negative-power lens means; and
an eyepiece lens means spaced downstream from said third negative-power lens means along the path of travel of the light for imaging the rays from said objective lens group;
said second positive-power lens group comprises a first positive-power meniscus lens concave to the front, a second doublet lens, and a third bi-convex lens; said second doublet lens comprises a positive-power crown lens and a negative-power meniscus flint lens concave to the front; said second positive lens group being made according to the following constructional data:

| LENS NO. | RADIUS (mm) | THICKNESS (mm) | AIR SPACE | n | CLEAR APERTURE ENTRANCE (mm) | CLEAR APERTURE EXIT (mm) |
|---|---|---|---|---|---|---|
| 210 | entrance = −32.968<br>exit = +15.740 | 3.100 | .100 | 1.713 | 19.58 | 20.04 |
| 212 | entrance = +187.890<br>exit = +15.473 | 4.200 | 0 | 1.487 | 18.61 | 18.35 |
| 214 | entrance = −15.473 | 1.200 | .100 | 1.847 | 18.35 | 18.57 |

-continued

| LENS NO. | RADIUS (mm) | THICKNESS (mm) | AIR SPACE | n | CLEAR APERTURE ENTRANCE (mm) | CLEAR APERTURE EXIT (mm) |
| --- | --- | --- | --- | --- | --- | --- |
| 216 | exit = +41.483<br>entrance = +41.923<br>exit = +65.345 | 2.700 | | 1.620 | 18.49 | 18.52 |

17. The objective lens system according to claim 16, wherein said objective lens system has an effective focal length of 21.7 mm. with an aperture of f/1.2.

18. An objective lens system in combination with an eyepliece lens system for use in night vision goggles, comprising:
- a first negative-power lens group;
- a second positive-power lens group spaced downstream along the path of travel of the light from said first negative-power lens group and having a central axis thereof at an angle to the central axis of said first negative-power lens group;
- a third negative-power lens means spaced downstream from said second positive-power lens group along the path of travel of the light, the central axis of said third negative-power lens means being at an angle to said central axis of said second positive-power lens group along the path of travel of the light;
- an entrance plane located adjacent said first negative-power lens group for admitting light to said first negative-power lens group, so that light travels from said first negative-power lens group to said second positive-power lens group and then to said third negative-power lens means; and
- an eyepiece lens means spaced downstream from said third negative-power lens means along the path of travel of the light for imaging the rays from said objective lens group;
- said third negative-power lens means comprising a field flattener lens having an entrance radius of −19.600 mm. and an exit radius of +458.847 mm., the thickness thereof being 1.20 mm., with an index of refraction of 1.806, with an clear aperture entrance radius of 15.650 mm. and a clear aperture exit radius of 16.490 mm.

* * * * *